US009811878B1

(12) United States Patent
Garg et al.

(10) Patent No.: US 9,811,878 B1
(45) Date of Patent: Nov. 7, 2017

(54) DYNAMIC PROCESSING OF IMAGE BORDERS

(75) Inventors: Parag K. Garg, Woodinville, WA (US); Jano D. Banks, Cupertino, CA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 939 days.

(21) Appl. No.: 13/602,566

(22) Filed: Sep. 4, 2012

(51) Int. Cl.
*G06T 3/40* (2006.01)
*H04N 7/01* (2006.01)

(52) U.S. Cl.
CPC ............ *G06T 3/40* (2013.01); *H04N 7/0122* (2013.01)

(58) Field of Classification Search
USPC ....................................................... 345/660
See application file for complete search history.

(56) References Cited

U.S. PATENT DOCUMENTS

| 2005/0094033 | A1* | 5/2005 | Schoner et al. ............... 348/558 |
| 2009/0252419 | A1* | 10/2009 | Knee ............................. 382/199 |
| 2011/0164111 | A1* | 7/2011 | Karaoguz et al. ............. 348/43 |
| 2013/0083078 | A1* | 4/2013 | Dai et al. ...................... 345/660 |

FOREIGN PATENT DOCUMENTS

WO    WO 2005/009024 A2 *  1/2005

* cited by examiner

*Primary Examiner* — Vu Nguyen
(74) *Attorney, Agent, or Firm* — Eversheds Sutherland (US) LLP

(57) ABSTRACT

Described herein are systems and methods of processing images comprising border features including, but not limited to letterboxing, pillarboxing, or windowboxing. Between the border features is primary content. The processing comprises scaling the primary content to increase prominence during presentation. Space unused during the presentation is filled with a revised border. Supplemental content may be presented in at least a portion of the revised border.

13 Claims, 10 Drawing Sheets

DYNAMIC PROCESSING OF IMAGE BORDERS

BACKGROUND

A wide variety of visual content (or content) is available to users for access electronically. This content may include television programming, movies, still images, and so forth. The content may be filmed or otherwise recorded in a variety of formats which may not correspond to a native format of a display device. For example, the recorded content may be in a standard definition format with a 4:3 aspect ratio compared to current televisions configured to present content in a high-definition format with a 16:9 aspect ratio. As a result of this mismatch, this recorded content may be modified into distribution content which includes borders to fill in the otherwise unused space on the display device during presentation. The borders may be horizontal black letterbox bars, vertical pillar bars, or both, also known as a windowbox. In some instances, the content may be relegated to a small area in the middle of the borders during presentation. As a result, the user experience of the content is impaired.

Certain implementations will now be described more fully below with reference to the accompanying drawings, in which various implementations or aspects are shown. However, various aspects may be implemented in many different forms and should not be construed as limited to the implementations set forth herein. Like numbers refer to like elements throughout.

DETAILED DESCRIPTION

A vast and ever growing collection of visual content (or "content") is available for users to access. This content may include television programming, movies, still images, and so forth. The content may be delivered using broadcast, cable, satellite, Internet, playback from a storage device such as a digital versatile disk ("DVD"), compact disc ("CD"), flash memory, hard disk drive, and so forth.

The content may be recorded in a variety of different formats which may not correspond to a native format of a display device. To aid in the presentation of content across different display devices with formats different from recorded content, some entities such as content creators, content distributors, and so forth may add initial borders. The initial borders fill in the otherwise unused space on the display device during presentation. The initial borders may be horizontal letterbox bars, vertical pillar bars, or both, also known as a windowbox. These borders may be symmetrical with one another along an axis of horizontal symmetry such as with letterboxing, along an axis of vertical symmetry such as with pillars, or both, such as in the case of windowboxing. These borders result in wasted areas on the display in which content or other information could be presented.

Windowboxing in particular results in a large amount of wasted space on the display device. As a result primary content, which is the portion of the image of interest to the user and which excludes the borders, may end up relegated to a small area in the middle of the borders during presentation. Because of the relatively small size, this may prove difficult for the user to see, or otherwise result in an impaired or less than satisfactory user experience.

Described herein are devices and methods for processing content to generate revised borders, scale the primary content to a larger size, or add supplemental content. The processing may occur dynamically, such as on user demand of the content. The supplemental content may be presented in at least a portion of revised borders. This supplemental content may include retrieved information. For example, the supplemental content may be content recommendations, data from one or more social networks, information about the content, advertisements, and so forth.

The content may also be processed using presentation templates. The presentation templates may provide for predetermined borders, scaling, supplemental content, and so forth.

Illustrative System

Figure 1:
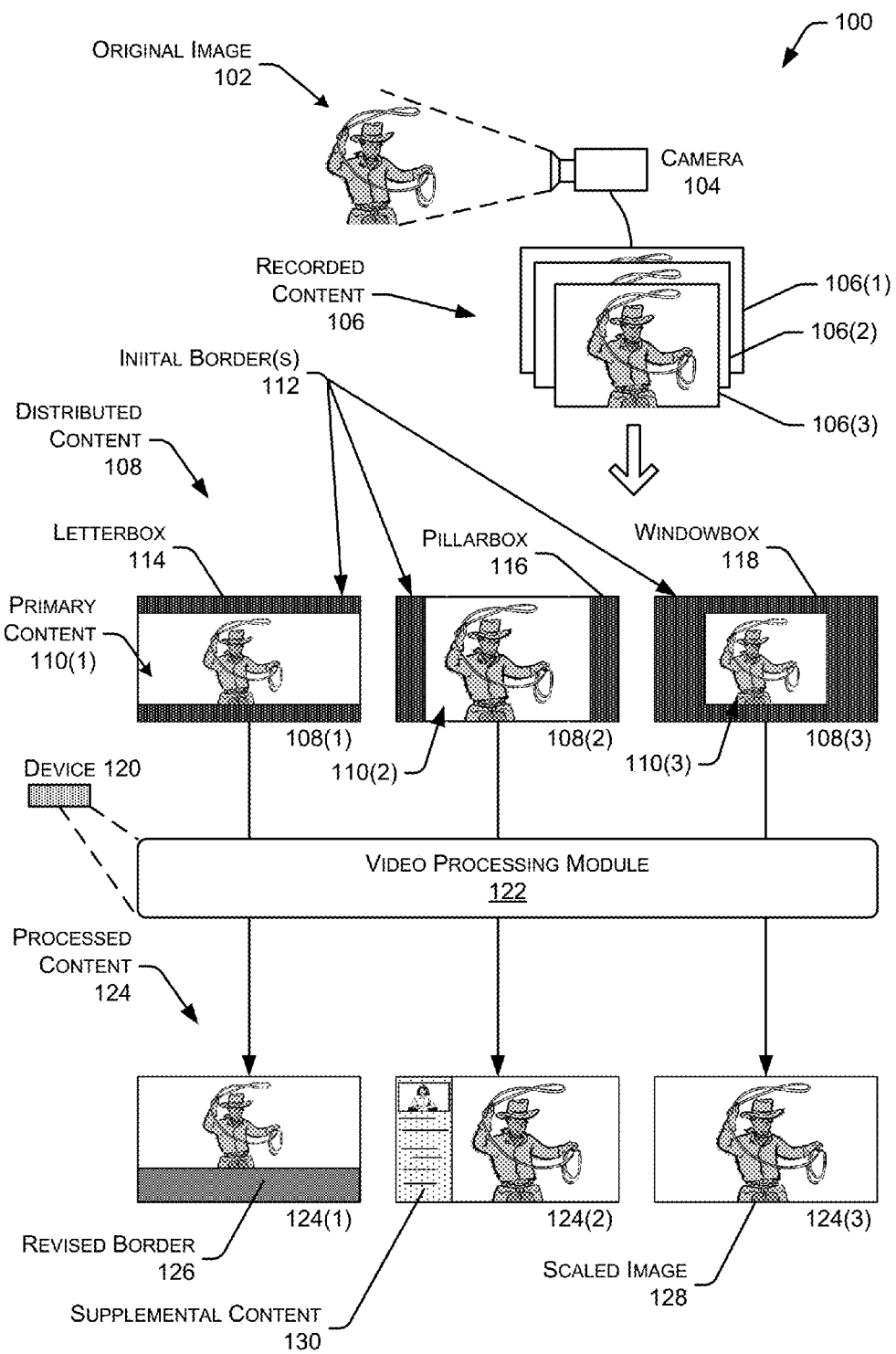
FIG. 1 illustrates a system for generating processed content from distributed content.

FIG. 1 illustrates a system 100 for processing content for consumption. The content may include television programming, movies, still images, and so forth. The content may be delivered using broadcast, cable, satellite, network such as the Internet, playback from a local media device such as a digital versatile disk ("DVD"), compact disc ("CD"), flash memory, hard disk drive, and so forth.

An original image 102 of a scene is captured by a camera 104 or other optical input device. Data from the camera 104 or another optical input device is stored as recorded content 106. Different pieces of the recorded content 106(1), 106(2), 106(3), . . . , 106(C) 106 may be in different formats. These formats may include different aspect ratios, resolutions, color depth, color gamut, and so forth. As used in this disclosure, the aspect ratio expresses a ratio of width of the presented image to height. For illustration and not by way of limitation, the recorded content 106 is in several formats including 106(1) with a 16:9 aspect ratio, 106(2) with a 14:9 aspect ratio, and 106(3) with a 4:3 aspect ratio. As mentioned, the recorded content 106(1)-(3) may differ from one another in resolution, color bit depth, color gamut, and so forth.

The recorded content 106 may processed to form distributed content 108. This distributed content 108 may be intended for presentation on a display device with a native format. The display device may comprise a smartphone, tablet computer, television, computer monitor, heads-up display, or other device configured to generate an image viewable by one or more users. The native format is the particular aspect ratio, resolution, color depth, and so forth associated with the display device or a class of display device. For example, a high-definition television ("HDTV") display device may have a native format of a 16:9 aspect ratio and resolution of 1920×1080 pixels.

The distributed content 108 includes primary content 110 and may include one or more initial borders 112. The primary content 110 comprises the imagery of interest to the user. The primary content 110 is based on, but may differ from, the recorded content 106. For example, the distributed content 108 may be a downsampled version of the recorded content 106 with the same aspect ratio.

Disparities may exist between formatting of the primary content 110 and the native format of the display devices. This may result in difficulties in presenting primary content 110. For example, the recorded content 106(2) in a 14:9 aspect ratio format does not correspond directly to the native format of a smartphone with a display device having a 16:9 display. As a result of these disparities, some entities such as content creators, content distributors, and so forth may add the initial borders 112.

The initial borders 112 fill in the space unused by the primary content 110 in the image frame presented on the display device during presentation. The initial borders 112 may be presented in various styles. The distributed content 108 may comprise a letterbox 114 border. The letterbox 114 border comprises horizontal bars extending above and below the primary content 110. In comparison, a pillarbox 116 comprises vertical bars or pillars on the left and right sides of the primary content 110. In some situations the primary content 110 may be within a windowbox 118, which comprises horizontal and vertical bars.

The letterbox 114 borders may be used when presenting primary content 110 which is too wide for the native format of the display device, such as when presenting 2.39:1 aspect ratio original content 110 on a 4:3 display device. The pillarbox 116 borders may be used when presenting primary content 110 which is narrower than the native display device. For example, when presenting original content 110 with a 4:3 aspect ratio on a 16:9 aspect ratio display device.

The windowbox 118 borders may occur due to previous formatting of the recorded content 106 to provide distributed content 108 suitable for different display device formats. For example, the recorded content 106(1) in the 16:9 aspect ratio may be provided as the distributed content 108(1) with letterbox 114 borders to make the distributed content 108 fit a 4:3 aspect ratio display. When presented on a 16:9 aspect ratio display device this distributed content 108, formatted for the 4:3 aspect ratio display, may then be provided with the pillarbox 116 border. As a result, the distributed content 108 may then appear on the display device with windowbox 118 borders. This may detract from the user experience because the primary content 110 is reduced in size in the image frame.

Depicted in the environment 100 is a device 120. The device 120 may comprise a server, table computer, smartphone, or other device comprising a processor, a memory, and so forth. The device 120 comprises a video processing module 122. The video processing module 122 is configured to accept distributed content 108 and generate processed content 124. The processed content 124 may be configured with one or more of: revised borders 126, a scaled image 128, or supplemental content 130.

The revised borders 126 replace or overlap the initial borders 112 in the image frame. The edges of the initial borders 112 may be indistinct, such as where the distributed content 108 has been transcoded from a first file format to a second format. The initial borders 112 may also exhibit visual noise or static, color variations, and so forth. The revised borders 126 may provide a distinct edge between the border and the primary content 110. The revised borders 126 may also provide a consistent effect such as a solid color, gradient, bitmap, and so forth within the border. The distinct edge, consistent effect, and so forth may improve the user experience. The revised borders 126 are discussed below in more detail below with regard to FIGS. 2-3.

The revised borders 126 may be positioned in about the same location at the initial borders 112, or may be placed elsewhere within an image frame of the processed content 124. The user or a module may select to move the primary content 110(1) higher in the image frame. For example, the user may wish to have the primary content 110 higher on the display device for more comfortable viewing. The video processing module 122 may shift the primary content 110(1) of the distributed content 108(1) to the top of the image frame in the processed content 124(1) while placing a revised border 126 extending across the bottom of the image frame. As a result, instead of the dual horizontal bars of the letterbox 114 borders, a single thicker revised border 126 is presented at the bottom of the image frame.

As used in this disclosure, "image" or "image frame" indicate a particular image. A still image may comprise a single image frame, while video may comprise a plurality of image frames presented in sequence.

The scaled image 128 is based on the primary content 110 present in the distributed content 108. Relative to the primary content 110 in the distributed content 108, the scaled image 128 is increased in size, increased in resolution, or both. For example, as illustrated here the distributed content 108(3) has windowbox 118 borders. The video processing module 122 may remove from the distributed content 108(3) the initial borders 112 and generate a scaled image 128 based on the primary content 110(3). This scaled image 128 may be configured to fill a maximum possible area in the image frame, as shown in the processed content 124(3). The scaled image 128 is discussed below in more detail with regard to FIG. 5.

The video processing module 122 may also provide the supplemental content 130 in the processed content 124. The supplemental content 130 may be visual or audible and may include content recommendations, data from one or more social networks, information about the content, advertisements, a narrative audio, and so forth. The supplemental content 130 may be associated with the primary content 110, such as production details for a movie being presented. The supplemental content 130 is described below in more detail with regard to FIG. 6.

Figure 2:
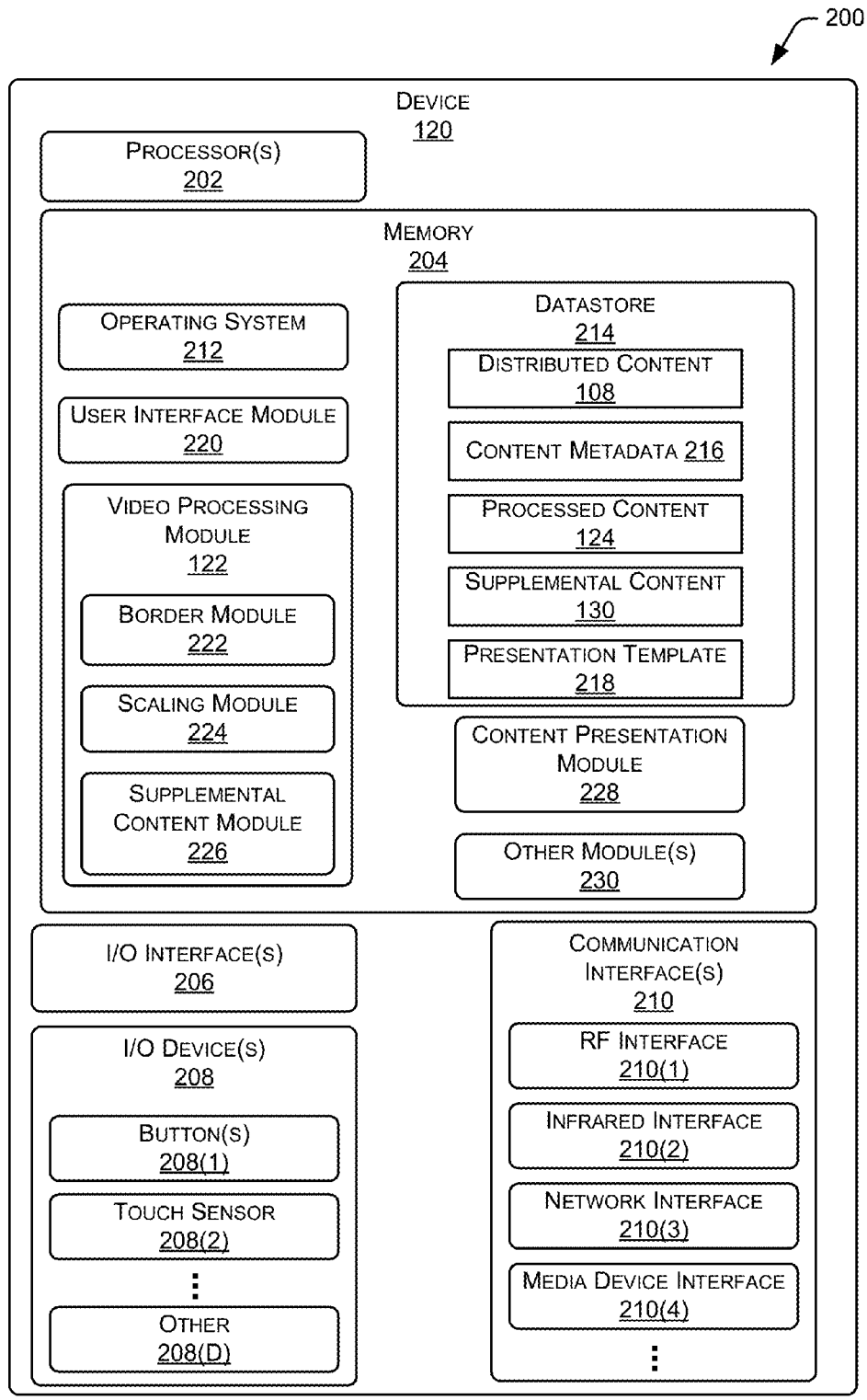
FIG. 2 illustrates a block diagram of a device configured to generate processed content comprising one or more of revised borders, scaled primary content, or supplemental content.

FIG. 2 illustrates a block diagram 200 of the device 120 configured to process the distributed content 108. The device 120 may comprise one or more processors 202, one or more memories 204, one or more input/output ("I/O") interfaces 206, one or more I/O devices 208, and one or more communication interfaces 210.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while power is provided or non-volatile in that information is retained without providing power.

The one or more I/O interfaces 206 allow for coupling I/O devices 208 to the device 120. The I/O interfaces 206 may comprise inter-integrated circuit ("I2C"), serial peripheral interface bus ("SPI"), universal serial bus ("USB"), RS-232, RS-432, Fibre Channel, and so forth. The I/O devices 208 may include buttons 208(1) such as in keypads or keyboards, or touch sensors 208(2). The buttons 208(1) may include mechanical buttons, softkeys, keys with integrated displays, and so forth. The touch sensors 208(2) may comprise interpolating force sensing resistor ("IFSR") arrays, capacitive sensors, optical touch sensors, and so forth.

One or more other I/O devices 208(D) such as speakers, microphones, displays, external memory devices, global positioning system receivers, and so forth may also be coupled to the device 120 using the I/O interfaces 206.

The one or more communication interfaces 210 provide for the transfer of data between the device 120 and other devices. The communication interfaces 210 may include, but are not limited to, personal area networks ("PANs"), wired local area networks ("LANs"), wireless local area networks ("WLANs"), wireless wide area networks ("WWANs"), and so forth. As shown here, the communication interfaces 210 may comprise one or more RF interfaces 210(1), one or more infrared interfaces 210(2), one or more network interfaces 210(3), one or more media device interfaces 210(4), one or more other interfaces, or a combination thereof.

The RF interface 210(1) may comprise a radio transmitter, radio receiver, or radio transceiver. The RF interface 210(1) may be compliant with one or more standard protocols, such as the Bluetooth™ PAN. In one implementation the RF interface 210(1) may be configured to communicate with a remote device configured to remotely control the device 120. The infrared interface 210(2) may comprise an infrared transmitter, infrared receiver, or an infrared transceiver. In some implementations the infrared interface 210(2) of the device 120 may consist of the infrared receiver and omit the infrared transmitter.

The network interface 210(3) may be configured to connect the device 120 wired or wirelessly to one or more networks. These networks may be public networks such as the internet, private networks, and so forth. These networks may include a LAN, WAN, WLAN, WWAN, and so forth. For example, the network interface 210(3) may comprise a transceiver and other devices configured to be compliant with the Institute of Electrical and Electronics Engineers ("IEEE") 802.11 standards. The network interface 210(3) may include a transceiver and other devices configured to be compliant with WWAN networks provided by one or more cellular carriers. For example, the network interface 210(3) may be configured to cellular data networks such as those based on the IEEE 802.16 standards such as WiMax.

The communication interface 210 of the device 120 may also comprise a media device interface 210(4) configured to couple the device 120 to another device such as the display device. In some implementations the media device interface 210(4) may comprise a high-definition multimedia interface ("HDMI"), LAN, WLAN, PAN, and so forth.

In other implementations other devices or components may be coupled to or incorporated within the device 120. For example, digital rights management ("DRM") devices may be provided to control access to content.

The one or more memories 204 may store code or program instructions for execution by the processor 202 to perform certain actions or functions. In some implementations at least a portion of the instructions may be stored in external memory accessible to the device 120, such as on a server accessible via the network interface 210(3).

These instructions in the one or more memories 204 may include an operating system 212. The operating system 212 is configured to manage hardware resources such as the I/O interfaces 206 and provide various services to applications executing on the processor 202.

The one or more memories 204 may also store a datastore 214 containing information about the operating system 212, configuration files, at least a portion of one or more of: the distributed content 108, content metadata 216, the processed content 124, the supplemental content 130, one or more presentation templates 218, or other data. The datastore 214 may comprise a database, flat file, linked list, or other data structure.

The content metadata 216 may include information such as location of the primary content 110 in one or more image frames, location of the initial borders 112 in one or more image frames, information about objects presented in the one or more image frames, and so forth. The content metadata 216 may be present on the device 120, retrieved from a remote device such as a server using one of the communication interfaces 210, or stored across both the device 120 and the server. In some implementations the distributed content metadata 216 may be embedded within the distributed content 108, the processed content 124, or both.

The one or more presentation templates 218 may include one or more settings associated with cropping, scaling, border placement, adding supplemental content, defining a presentation resolution for the visual content, or otherwise processing the content with the video processing module 122. For example, the presentation template 218 may be configured to designate particular placement of borders, such as placing the revised border 126 along the top of the image frame for a particular scene.

The presentation templates 218 may be designated for use with different pieces of distributed content 108, or for a particular piece of distributed content 108. For example, the presentation template 218(1) for a particular piece of distributed content 108(1) may be configured to designate a particular area to scale such that the particular area fills the screen, rather than use a letterbox 114 border.

The one or more presentation templates 218 may be static as described above, or vary during presentation of the content. Variable presentation templates 218 allow for changes in the processing of the distributed content 108 at different points in the presentation. Continuing the above example, in the presentation template 218(1) designed for use with the distributed content 108(1), the first three scenes may have designated areas of the primary content 110(1) which are scaled up to fill the image frame while later panoramic scenes may be configured to present the primary content 110 in the letterbox 114 such that the entire panoramic image is visible, albeit smaller on the display.

The presentation templates 218 may be generated by a content provider, distributor, third-party processor, or individuals. In some implementations these presentation templates 218 may be distributed via a server, peer-to-peer network, and so forth. For example, a user may generate a presentation template 218 comprising a sequence of particular cropping, scaling, and so forth for different scenes in a particular movie. The user may share this presentation template 218 with other users who may choose to apply the presentation template 218 to the movie during their consumption.

The other data may include user preferences such as what processing to apply for content, content presentation preferences, access data for supplemental content 130, and so forth.

A user interface module 220 stored in the one or more memories 204 is configured to provide a user interface for presentation to the user. For example, the user interface module 220 may provide a web interface configured for presentation on the display device. The user interface module 220 may also be configured to accept input from the user. For example, the user interface module 220 may be configured to accept data from a web page.

The video processing module 122 may also be stored in the one or more memories 204. As described above, the video processing module 122 generates the processed content 124 from the distributed content 108. The video processing module 122 may comprise one or more of a border module 222, a scaling module 224, or a supplemental content module 226.

The border module 222 is configured to determine presence of the one or more initial borders 112 and may also generate one or more of the revised borders 126. The border model 222 may determine the presence based at least in part upon information such as metadata associated with or embedded within with the distributed content 108. This metadata may be stored locally on the device 120 or retrieved from another device such as a server. The metadata may reflect changes in the initial borders 112 present in the recorded content 106, the distributed content 108, or both. For example, the initial borders 112 may vary during presentation of recorded content 106(1) which itself is composed of a collection of other pieces of recorded content 106(4), 106(5), and so on.

In one implementation the metadata may designate a first set of coordinates in the image frame for a first corner of a rectangle containing the primary content 110 and a second set of coordinates in the image frame for a second corner of the rectangle diagonally opposite the first corner. In another implementation the initial borders 112 may be designated. For example, a set of coordinates may define the rectangles associated with the initial borders 112.

The metadata may be configured to specify the primary content 110, or include information to disallow processing such as scaling. For example, a cinematographer may intentionally use a windowbox 118 effect for dramatic purposes during a scene. In this example, the image frames for the scene may be have associated metadata which includes instructions to not provide scaling to eliminate the windowbox 118 effect.

The border module 222 may also be configured to analyze pixels or groups of pixels to determine the initial borders 112. These pixels may be from a plurality of image frames. These image frames may be temporally non-adjacent image frames. For example, relative to a particular frame, the image frames at positions 1, 10, 15, 100, and 200 may be used for the determination, rather than sampling every frame from 1 to 200. In comparison the image frames 1 and 2 are temporally adjacent to one another, as are image frames 99 and 100.

The initial borders 112 may be determined based on one or more of metadata associated with the content, shape, position, color, symmetry, and so forth. For example, metadata describing an area within which the primary content 110 is found may be associated with or embedded into the distributed content 108. The initial borders would be areas other than those designated as being the primary content 110. In another example, objects with a particular aspect ratio corresponding to letterbox 114 or pillarbox 116 borders and which are adjacent to two edges of an image frame may be identified as initial borders 112. Determination by the border module 222 of the initial borders 112 based at least in part on color and symmetry is discussed below in more detail with regard to FIGS. 3-4. When a presentation template 218 is associated for use with the distributed content 108, the border module 222 may use the information supplied by the presentation template 218 to determine and generate the borders, if any.

The scaling module 224 is configured to scale or resize the primary content 110. This scaling may be upscaling with addition of pixels such as when enlarging the primary content 110 to fill the image frame or downscaling with removal of pixels such as when reducing the primary content 110. Scaling of the primary content 110 image may include use of bilinear interpolation, bicubic interpolation, Lanczos resampling, supersampling, finite impulse response filter-based scaling, and so forth. The degree of scaling may be specified by a scaling factor. For example, a scaling factor of "2" may indicate the size of the primary content 110 will be doubled or "0.5" in which the size of the primary content 110 will be halved. In some implementations a maximum scaling factor may be set. This maximum scaling factor may be determined to retain an acceptable level of image quality. The maximum scaling factor may be manually or automatically determined.

In some implementations, the scaling module 224 may also determine the area occupied by the primary content 110. For example, the scaling module 224 may analyze the image to determine a region of a particular aspect ratio within which motion is present.

The scaling module 224 may be configured to modify color depth, gamut, or other image characteristics with or without affecting the resolution of the primary content 110. For example, a 32 bit color depth may be reduced down to a 16 bit color depth suitable for presenting on the display device only capable of displaying 16 bits of color. When a presentation template 218 is associated with the distributed content 108, the scaling 224 may use the information supplied by the presentation template 218 to determine scaling, if any. Scaling is discussed in more detail below with regard to FIG. 5.

The supplemental content module 226 stored in the one or more memories 204 is configured to determine and provide the supplemental content 130 for presentation. The supplemental content module 226 may be configured to access supplemental content 130 stored in the datastore 214, or receive supplemental content 130 from another device such as a server using a network such as the internet. The supplemental content module 226 may merge the supplemental content 130 within the primary content 110, the one or more of the revised borders 126, or a combination thereof. The supplemental content 130 is discussed in more detail below with regard to FIG. 6. When a presentation template 218 is associated with the distributed content 108, the supplemental content module 226 may use the information supplied by the presentation template 218 to determine the supplemental content 130 for presentation, if any.

The device 120 may also be configured to present content with a display device. In some implementations, the display device may be incorporated into the device 120. A content presentation module 228 may be stored in the one or more memories 204. The content presentation module 228 is configured to present for consumption at least a portion of content to the users using the I/O interfaces 206, the communication interfaces 210, or both. For example, the content presentation module 228 may be configured to retrieve the distributed content 108 from a server using a network and output the processed content 124 for presentation on the display device.

The video processing module 122 may be configured to generate processed content 124 based at least in part on the characteristics of a particular display device. For example, the processed content 124 generated for a display device with a 16:9 aspect ratio television and a 1920×1080 resolution may differ from that for a 3:2 aspect ratio smartphone with a 960×640 resolution. The characteristics of the display device may be manually entered by a user, automatically determined, or a combination thereof. For example, the device 120 may receive information about the display device coupled to the media device interface 210(4).

Other modules 230 may also be stored in the memory 204. For example, a user authentication module may be configured to authenticate the user 102 to determine what content is accessible to the user 102.

Figure 3:
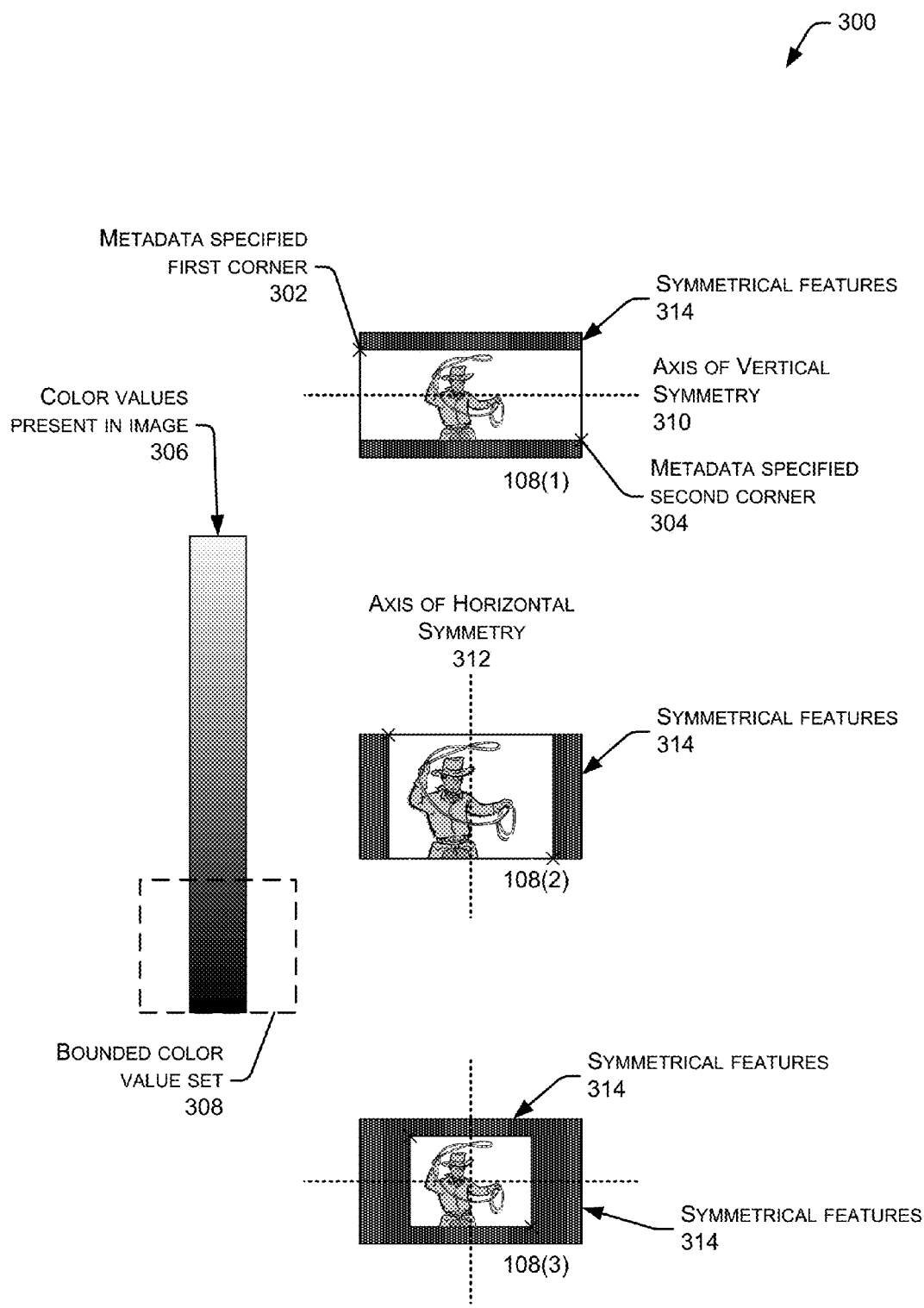
FIG. 3 illustrates aspects which may be used to determine initial borders in the distributed content.

FIG. 3 illustrates aspects 300 which may be used to determine the initial borders. As described above, initial borders 112 may be added to recorded content 106 to form distributed content 108. These initial borders 112 may be a solid color such as black, blue, gray, white, and so forth.

The initial borders 112 may exhibit noise or have indistinct edges, such as where the distributed content 108 has been transcoded from a first file format to a second format, when the distributed content 108 has been scaled to a larger size, due to data transmission errors, and so forth. These factors may result in the initial borders 112 appearing non-uniform during presentation, which negatively impacts the user experience during consumption of the content. For example, a static filled fuzzy initial border 112 may be distracting to the user. The border module 222 may be configured to determine or detect the one or more initial borders 112 and in some implementations generate the one or more revised borders 126 for presentation in place of the initial borders 112.

A digital image comprises a plurality of pixels. In some implementations these pixels may be arranged in rows and columns, and a position of a particular pixel may be expressed as a set of Cartesian coordinates, such as along a horizontal x axis and a vertical y axis. In some implementations, the content metadata 216 may include a description of where the primary content 110 is arranged within one or more of the image frames which comprise the distributed content 108, the recorded content 106, or both. For example, as depicted here, a metadata specified first corner 302 is at a top left pixel associated with the primary content 110(1), while a metadata specified second corner 304 is at a bottom right pixel associated with the primary content 110(1). This pair of coordinates may be used to define a rectangle in the image frame within which the primary content 110 is presented. In other implementations other metadata may be used to define the area of primary content 110, the one or more initial borders 112, or both.

Each of the pixels in the digital image may have a particular color value. For ease of discussion, and not by way of limitation, a grayscale depiction of color values present in an image 306 is shown. For example, where the color values are represented by 8 bits, 256 levels may be defined. These colors may range from dark 0 to white 255 as depicted here.

Due to application of data compression techniques, data transmission errors, and so forth, the color of a given pixel may shift from an intended value such as a value of 0. For example, a pixel in the recorded content 106 may have a value of 17, while the same pixel in the distributed content 108 may have a value of 19.

The initial borders 112 may be determined based at least in part on their color values. To account for variations in the colors such as those described above, a bounded color value set 308 may be defined. The bounded color value set 308 includes a range within which a pixel may be part of the initial border 112. For example, where the image is grayscale encoded with 8 bits, the bounded color value set 308 for a black border may extend from color values 0 to 25. The border module 222 may be configured to determine regions of pixels with color values within the bounded color value set 308 as an initial border 112.

In addition to, or instead of color value, the border module 222 may analyze the overall shape and symmetry to determine the initial borders 112. The border module 222 may analyze groups of pixels to determine edges of the initial borders 112. The border module 222 may be configured to weight pixels differently based on position within the image frame. For example, the pixels in the center of the image frame may have a weighting of zero probability of being a border while pixels adjacent to the perimeter of the image frame may have a greater weighting.

The initial borders 112 may be symmetrical. For example, a rectangular image may contain initial borders 112 which are symmetrical about one or more axes. An axis of vertical symmetry 310 may extend horizontally across a vertical center of the image, as shown here with a broken line. Likewise, an axis of horizontal symmetry 312 may extend vertically across a horizontal center of the image, as shown here with a broken line.

The initial borders 112 may be detected as symmetrical features 314 relative to the axis of vertical symmetry 310, the axis of horizontal symmetry 312, or both. For example, the distributed content 108(1) which presents letterbox 114 style initial borders 112 exhibits symmetry about the axis of vertical symmetry 310. The individual horizontal bars providing symmetrical features 314 in the image. The border module 222 may be configured to detect these symmetrical features 314. Based at least in part on the symmetry, the symmetrical features 314 may be determined to be initial borders 112.

The distributed content 108 may comprise borders which are symmetrical about both axes 310 and 312. For example, as depicted here the distributed content 108(3) which has windowbox 118 initial borders 112 is symmetrical about both horizontal and vertical axes.

While the symmetry is described as horizontal or vertical relative to the image frame, in some implementations the symmetry may be determined using different axes. For example, symmetry may be compared relative to a diagonal from one corner to an opposing corner of the image, or radially from a center point of the image.

The border module 222 may be configured to determine boundaries of the primary content 110 based on one or more of the color, symmetry, shape, and so forth. Once the initial borders 112 have been determined, the remaining area excluding the initial borders 112 may be designated as the primary content 110. In another implementation, the primary content 110 may be determined initially and the other areas designated as initial borders 112.

Figure 4:
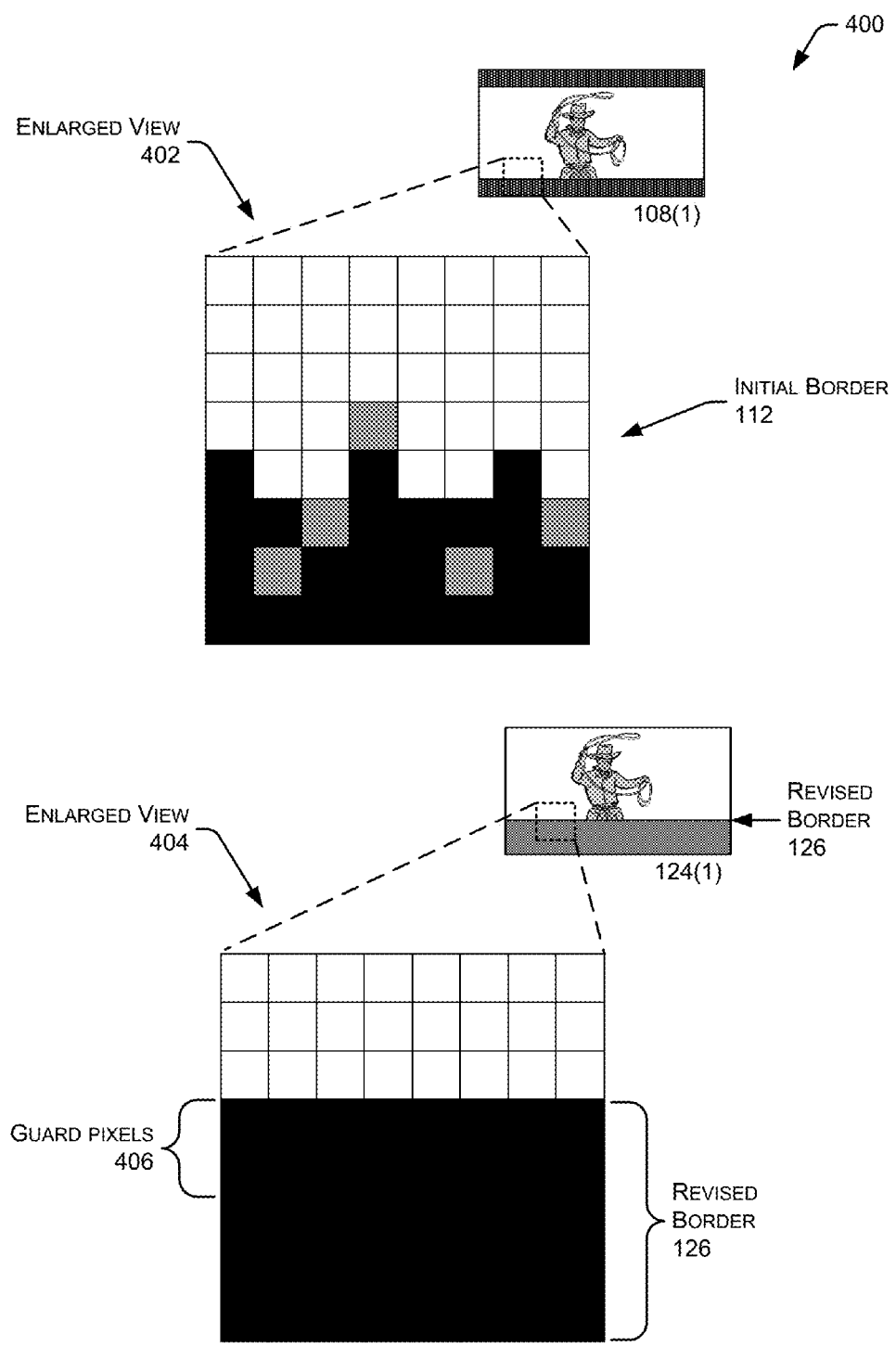
FIG. 4 illustrates an initial border and a revised border with guard pixels.

FIG. 4 illustrates 400 the initial border 112 and the revised border 126. As described above and shown here in an enlarged view 402, the initial border 112 may be somewhat indistinct and may contain variations in color values or other visual noise. For example, in the enlarged view 402 some pixels are different color values.

The border module 222 is configured to determine the location of the one or more initial borders 112. This determination may use an edge detection process to look for the transition between the initial borders 112 and the primary content 110. In some implementations, the edge detection may be based at least in part on the bounded color value set 308.

In some implementations, the border module 222 may generate the revised border 126 such as depicted here in the enlarged view 404. The revised border 126 may be configured to exhibit a particular visual effect such as a solid color, and may be more distinct than the initial border 112. To provide the distinction, guard pixels 406 may be provided in the revised border 126. For example, the guard pixels may comprise one or more rows of pixels of a particular value where the revised border 126 is in the letterbox format 114. Similarly, one or more columns of pixels may be used where the revised border 126 is in the pillarbox 116 format. The one or more revised borders 126 may thus comprise replacing at least one row or column of pixels in the image frame with guard pixels extending beyond the initial borders 112. In the processed content 124 the border module 222 may overlay or replace the initial borders 112 with the one or more revised borders 126.

The border module 222 may be configured to place the one or more revised borders 126 in the about the same positions as the one or more initial borders 112, or in different positions. For example, instead of a letterbox 114 style revised border 126, the revised border 126 may be a single bar across only the bottom of the image as depicted at 124(1) in FIG. 1. This may be done to shift the primary content 110(1) upwards in the image frame. A shift of the primary content 110 and the revised borders 126 in the processed content 124 may also be performed to increase viewer comfort, avoid defective pixels areas in a particular display device, provide space for supplemental content 130, and so forth.

Figure 5:
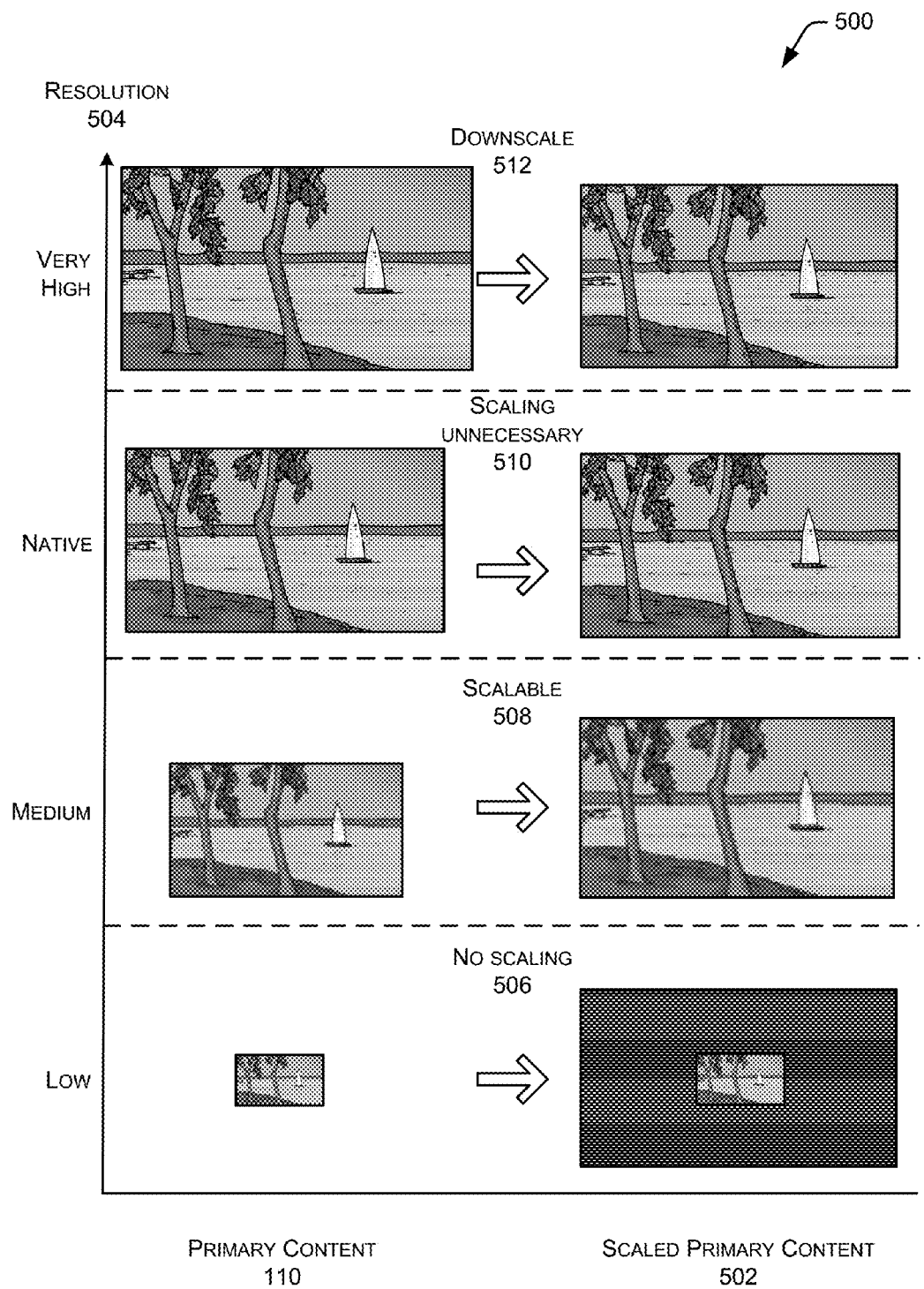
FIG. 5 illustrates different resolutions of primary content and different scaling which may be applied to the primary content.

FIG. 5 illustrates different resolutions 500 of the primary content 110 and scaling which may be applied. As described above, in some implementations the primary content 110 may reduced in size, such as when the distributed content 108 includes the windowbox 118 style of initial borders 112.

To improve the user experience, the scaling module 224 may be configured to modify the size of the primary content 110 by scaling. The scaling module 224 may implement bilinear interpolation, bicubic interpolation, Lanczos resampling, supersampling, downsampling, finite impulse response filter-based scaling, and so forth.

In this illustration 500 a first column depicts the primary content 110 before scaling with sizes of the images relative to one another based on the scale. A second column depicts the scaled primary content 502, where scaling has taken place. Unless otherwise specified, in this disclosure references to the primary content 110 may also include the scaled primary content 502.

A vertical axis indicates relative resolution 504 of the images. This range extends from low to very high resolution. By way of illustration and not as a limitation, the low resolution may be 320×200 pixels, the medium resolution may be 1280×720 pixels, the native resolution may be 1920×1080 pixels, and the very high may be 4096×3112 pixels.

In some situations, the primary content 110 may be of such low resolution that it cannot be scaled and maintain an acceptable appearance to the user. For example, the low resolution image with 320×200 pixels would not acceptably scale to fill a large portion of a 1920×1080 display. In this situation, based at least in part on the resolution of the primary content 110, no scaling 506 may take place.

In comparison, at 508 the medium resolution 504 content may be scaled to a larger size to fill the image frame of the display device. This upscaling may include the use of interpolation, supersampling, or other techniques to maintain an acceptable level of image quality. As described above, in some implementations the scaling factor applied to the primary content 110 may be restricted by the maximum scaling factor to maintain an acceptable level of image quality in the processed content 124.

The scaling may comprise determining an aspect ratio of the primary content 110. As described above, the aspect ratio comprises a ratio of width to height of the primary content 110. Scaled primary content may be generated by increasing a size of the primary content 110 by a scaling factor configured to present the primary content 110 with a maximum area within the image frame while maintaining the aspect ratio. A processed image frame may be generated which comprises the scaled primary content. As shown here, the scaled primary content 502 fills the image frame.

In some implementations, such as where the primary content 110 and the image frame have dissimilar aspect ratios, revised borders may be provided. One or more revised borders may be generated based at least in part on the scaled primary content 502 and the processed image frame may further comprise the one or more revised borders 126.

Where the primary content 110 is provided in the native resolution of the display device, scaling is unnecessary 510. However, in some implementations scaling may be used to enlarge a particular portion of the image.

When the distributed content 108 contains very high resolution data, the scaling module 224 may be configured to downsample to the native resolution of the display device. In some implementations downsampling may be done to reduce data transfer requirements.

Figure 6:
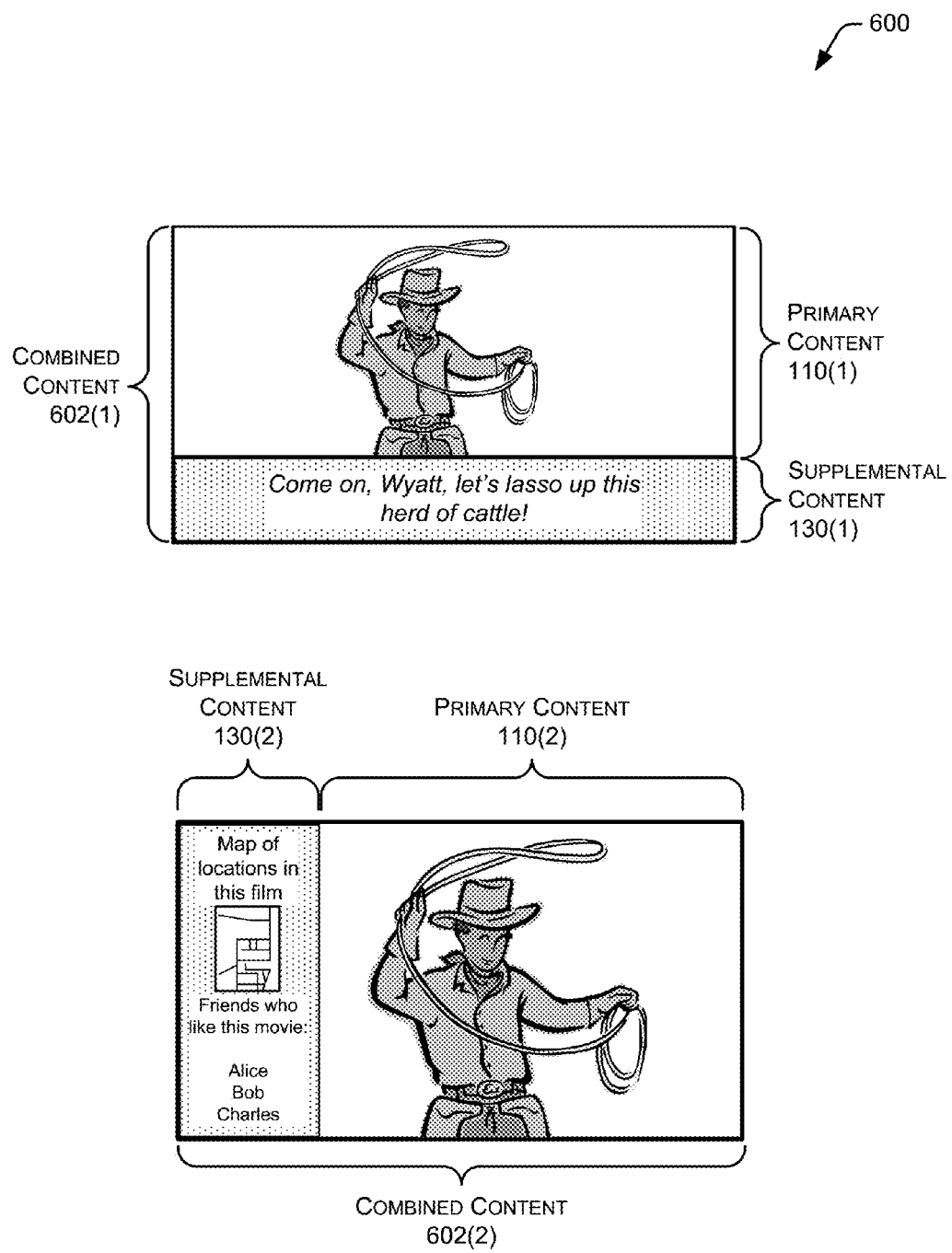
FIG. 6 illustrates supplemental content presented in the revised border.

FIG. 6 illustrates 600 the supplemental content 130 which may be presented in the revised border 126. The supplemental content module 226 is configured to generate combined content 602 comprising the supplemental content 130 in addition to the primary content 110 or the scaled primary content 502. As described above, the primary content 110 may be scaled by the scaling module 224, and the one or more revised borders 126 may be generated by the border module 222. In some implementations, the primary content 110 may be downscaled to a smaller size to allow for presentation of the supplemental content 130.

The supplemental content module 226 may present supplemental content 130 within the revised borders 126, a presentation area for the primary content 110, or both. The supplemental content 130 comprises other information which may, but need not be, associated with the primary content 110. For example, the supplemental content module 226 may include content recommendations, text captioning, data from one or more social networks, information about the content, advertisements, and so forth.

In one implementation, combined content 602(1) comprises the processed content 124(1) with supplemental content 130(1) comprising captioning. As shown, here the supplemental content 130(1) is presented in this revised border 126 across the bottom of the display. The revised border 126 consolidates the horizontal bars of the letterbox 114 effect, allowing for increased contiguous area within the image frame for presentation of data.

In comparison, combined content 602(2) comprises the processed content 124(2) with supplemental content 130(2) presented to the left of the primary content 110(2). The revised border 126 in this example consolidates the vertical bars of the pillarbox 116 effect. As above, this increases contiguous area within the image frame for presentation of data.

Illustrative Processes

Figure 7:
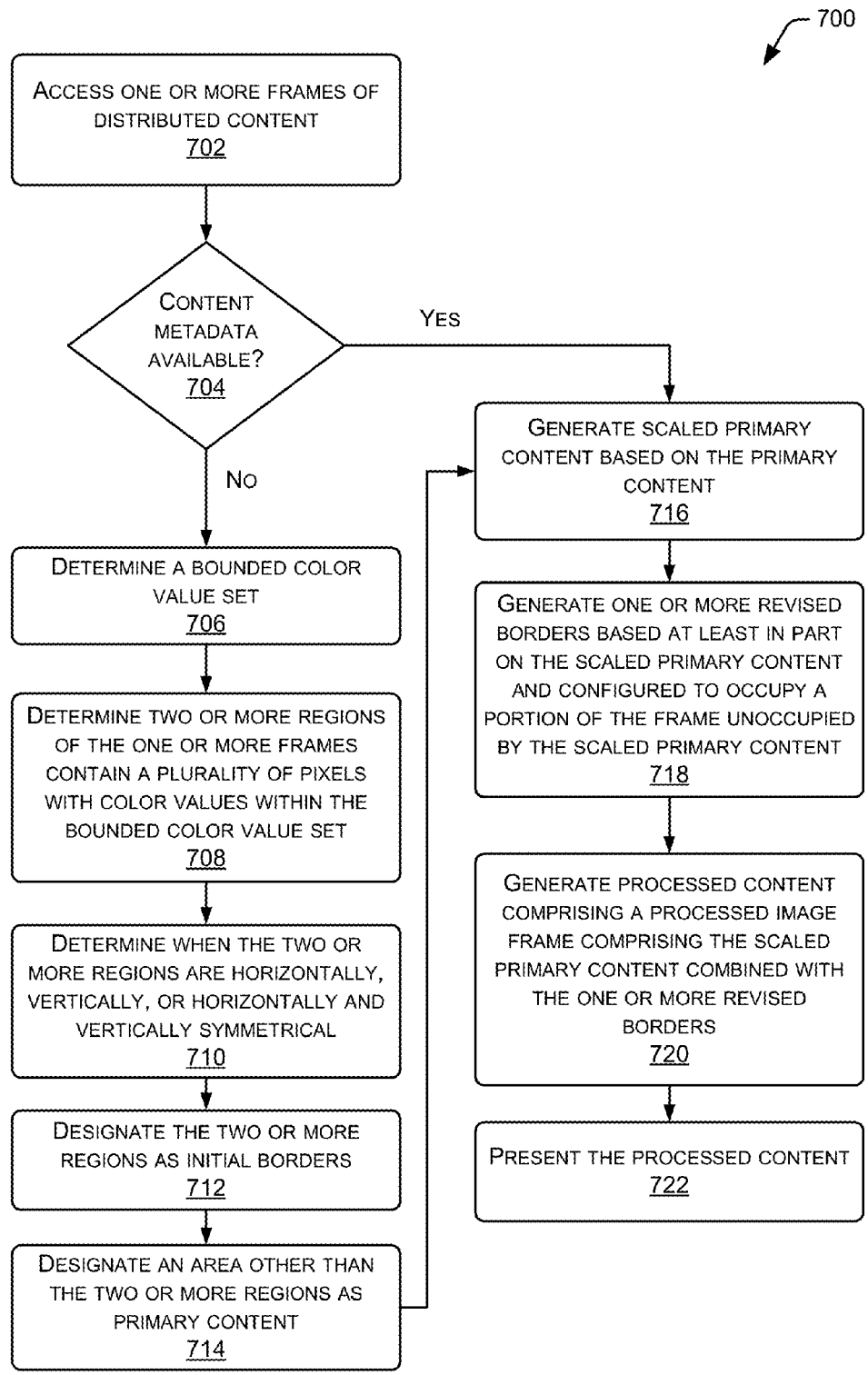
FIG. 7 illustrates a process for generating processed content comprising scaled primary content and revised borders.

FIG. 7 illustrates a process 700 for generating processed content 124 comprising the scaled primary content 502 and the revised borders 126. The process may be implemented at least in part by the video processing module 122.

Block 702 accesses visual content comprising one or more image frames. For example, the video processing module 122 may access the distributed content 108 stored in the datastore 214. The visual content may comprise a still image with a single image frame or video with a plurality of image frames.

Block 704 determines when content metadata 216 describing the position of the primary content 110, the initial borders 112, or both within the image frame is available. For example, the content metadata 216 may include coordinates for the first corner 302 and the second corner 304 which define a rectangle in the image frame within which the primary content 110 is presented. When the content metadata 216 describing the position of the primary content 110, the initial borders 112, or both is unavailable, the process proceeds to 706.

Block 706 determines a bounded color value set. The color values in the set 308 may extend from a first color value to a second color value. Continuing the example above, the bounded color value set 308 may be for color values ranging from a first value of 0 to a second value of 25, inclusive.

Block 708 determines two or more regions of the one or more frames contain a plurality of pixels with color values within the bounded color value set 308. In some implementations the one or more regions may comprise the letterbox 114, the pillarbox 116, or the windowbox 118 optical or visual effect included in the one or more image frames. The one or more regions may be rectangular in shape.

Block 710 determines when the two or more regions are symmetrical relative to the vertical axis of symmetry 310, the horizontal axis of symmetry 312, or both.

Block 712 designates the two or more regions as the initial borders 112. This designation may be based at least in part on the color values, symmetry, overall shape of the one or more regions, and so forth.

Block 714 designates an area other than the two or more regions as the primary content 110. In another implementation the designation may be based at least in part on variations in color values, lack of symmetry, and so forth. For example, a rectangle centered on a center of the image frame which includes asymmetrical content across a plurality of image frame may be determined to be the primary content 110.

Block 716 generates scaled primary content 502 based on the primary content 110. The scaled primary content 502 may be configured to occupy a larger area in the image frame compared to the primary content 110 while maintaining an original aspect ratio of the primary content 110. By maintaining the original aspect ratio, stretching or compression of the image is avoided, which may adversely impact the user experience. The scaled primary content 502 may be configured to occupy a maximum area possible.

The scaled primary content 502 may be configured to scale up to a pre-determined maximum scaling factor which retains an acceptable level of image quality. In some implementations the scaling may be determined based at least in part on the characteristics of the display device, such as the native format. The scaling is discussed in more detail below with regard to FIG. 8.

Block 718 generates one or more revised borders 126 based at least in part on the scaled primary content 502 and configured to occupy a portion of the frame unoccupied by the scaled primary content. For example, where the scaled primary content 502 now occupies an increased area within the image frame compared to the primary content 110, the one or more revised borders 126 may be used to fill in the remainder of the image frame. As mentioned above, the scaled primary content 502 or the primary content 110 may be shifted or moved within the image frame, and the revised borders 126 may be adjusted to fill in the remainder of the image frame. In some implementations, the one or more revised borders 126 may comprise a row, a column, or a row and column of guard pixels 406 extending beyond the one or more initial borders 112.

Block 720 generates processed content 124 comprising a processed image frame comprising the scaled primary content 502 combined with the one or more revised borders 126. Block 722 presents the processed content 124, such as with the display device.

Returning to block 704, when the content metadata 216 describing the position of the primary content 110, the initial borders 112, or both is available, the process proceeds to 716. As described above, the processed content 124 may be generated which comprises the scaled primary content and the one or more revised borders 126.

Figure 8:
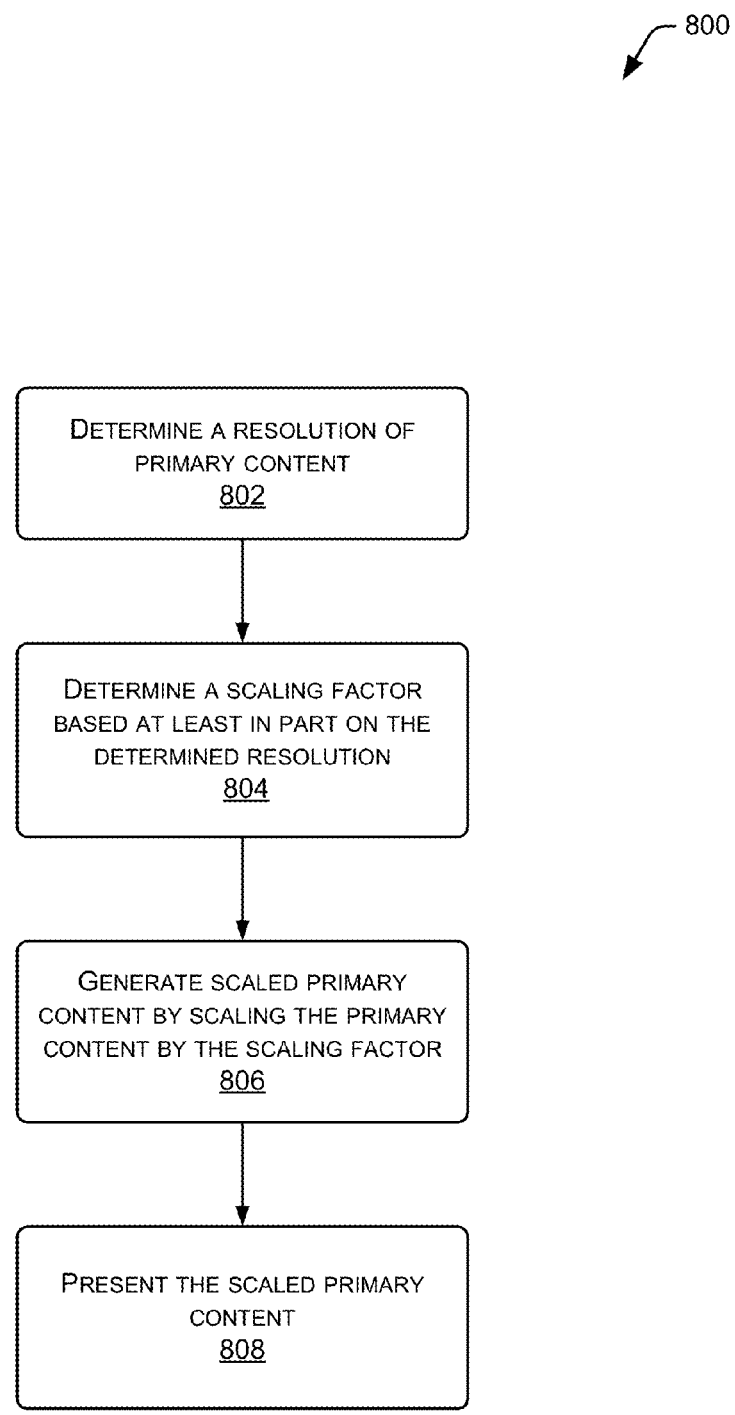
FIG. 8 illustrates a process for generating scaled primary content based at least in part on the resolution of the primary content.

FIG. 8 illustrates a process 800 for generating the scaled primary content based at least in part on the resolution of the primary content 110. The process may be implemented at least in part by the scaling module 224.

Block 802 determines a resolution of the primary content 110. The aspect ratio may be determined based at least in part on the resolution of the primary content 110. As described above, the primary content 110 may be determined in the distributed content 108 by the border module 222, the scaling module 224, or a combination thereof. For example, the initial borders 112 may be determined and the area excluding the initial borders 112 may be designated as the primary content 110. In another example, the primary content 110 may be designated such as by shape, position, pixel variation, asymmetry, and the other areas designated as the initial borders 112.

As described above with regard to FIG. 5, in some situations the resolution of the primary content 110 may be too low to provide an acceptable image when scaled to a larger size. Block 804 determines a scaling factor based at least in part on the determined resolution. In some implementations, the scaling factor may be configured to present the primary content 110 in a maximum area while maintaining the aspect ratio. In another implementation, when the determined resolution is below a minimum resolution, the scaling factor may be unity, leaving the primary content 110 unscaled.

By maintaining the aspect ratio, the image is not compressed or stretched, resulting in distortion which may result in an unpleasant user experience. In some implementations, a pre-determined maximum scaling factor may be set, to prevent generation of an unacceptable image. For example, a scaling factor of 4 may be determined to result the largest images with acceptable image quality.

Block 806 generates the scaled primary content 502 by increasing a size of the primary content by the scaling factor.

In some implementations, the scaling may also reduce the size of the primary content 110. As described above, the generating the one or more revised borders 126 may be based at least in part on the scaled primary content 502.

Block 808 presents the scaled primary content, such as with the display device. In some implementations the scaled primary content 502 may be merged with the revised borders 126, the supplemental content 130, or both for presentation.

Figure 9:
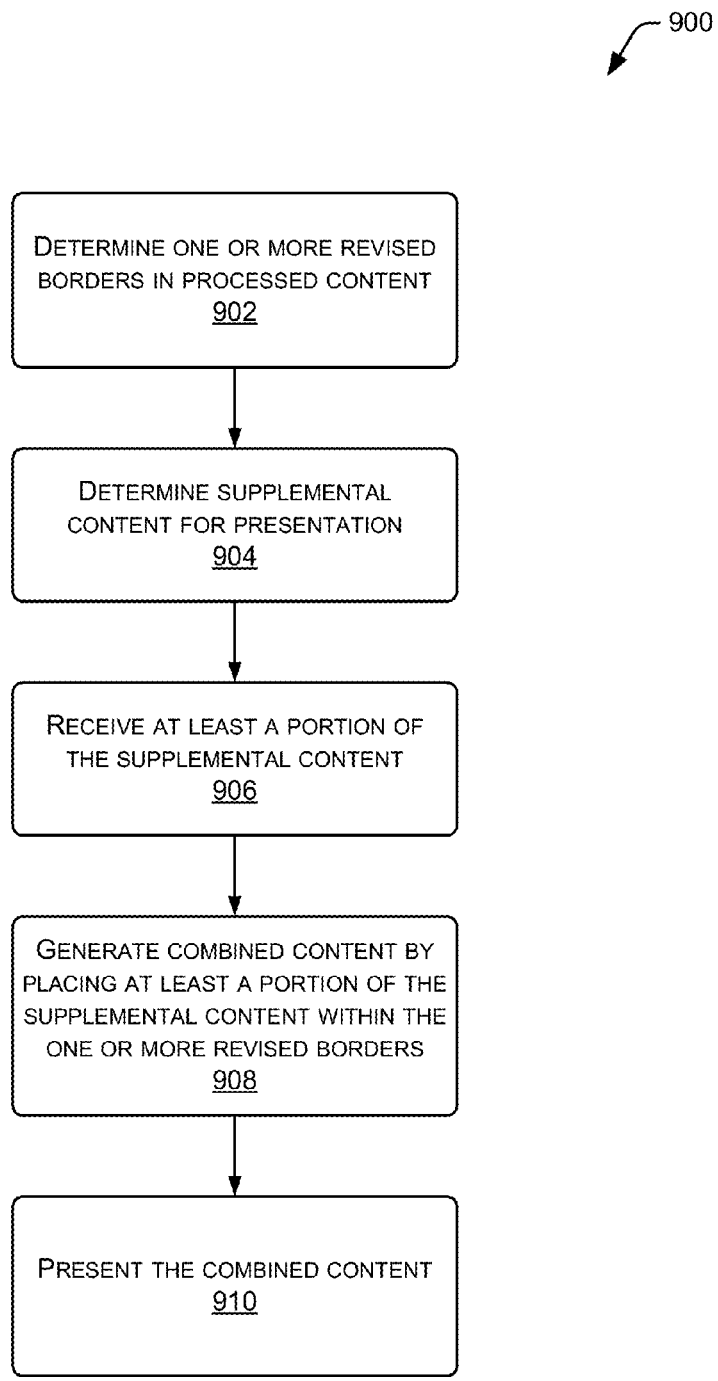
FIG. 9 illustrates a process for generating combined content comprising the supplemental content.

FIG. 9 illustrates a process 900 for generating the combined content 602. As described above, the combined content 602 comprises the supplemental content 130 and the primary content 110 or the scaled primary content 502. The process may be implemented at least in part by the supplemental content module 226.

Block 902 determines one or more revised borders 126 in the processed content 124. For example, the border module 222 may provide the location of the one or more revised borders 126 in the image frame.

Block 904 determines supplemental content 130 for presentation. In some implementations the supplemental content 130 may be associated with the primary content 110. For example, when the primary content 110 comprises a western-themed movie, the supplemental content 110 may comprise advertisements for western-style clothing, details about the filming of the movie, and so forth.

Block 906 receives at least a portion of the supplemental content 130. This may be received from the datastore 214 within the device 120, or from an external device such as a server via the network interface 210(3).

Block 908 generates combined content 602 by placing at least a portion of the received supplemental content 130 within the one or more revised borders 126. In one implementation the combined content 602 may be generated by merging or overlaying at least a portion of the received supplemental content 130 within the area designated as the primary content 110. In other implementations the combined content 602 may be generated by matting, compositing, or replacing a portion of the one or more revised borders 126 with the received supplemental content 130.

Block 910 presents the combined content 602, such as via the display device. The user now is able to experience the primary content 110 as well as the supplemental content 130.

Figure 10:
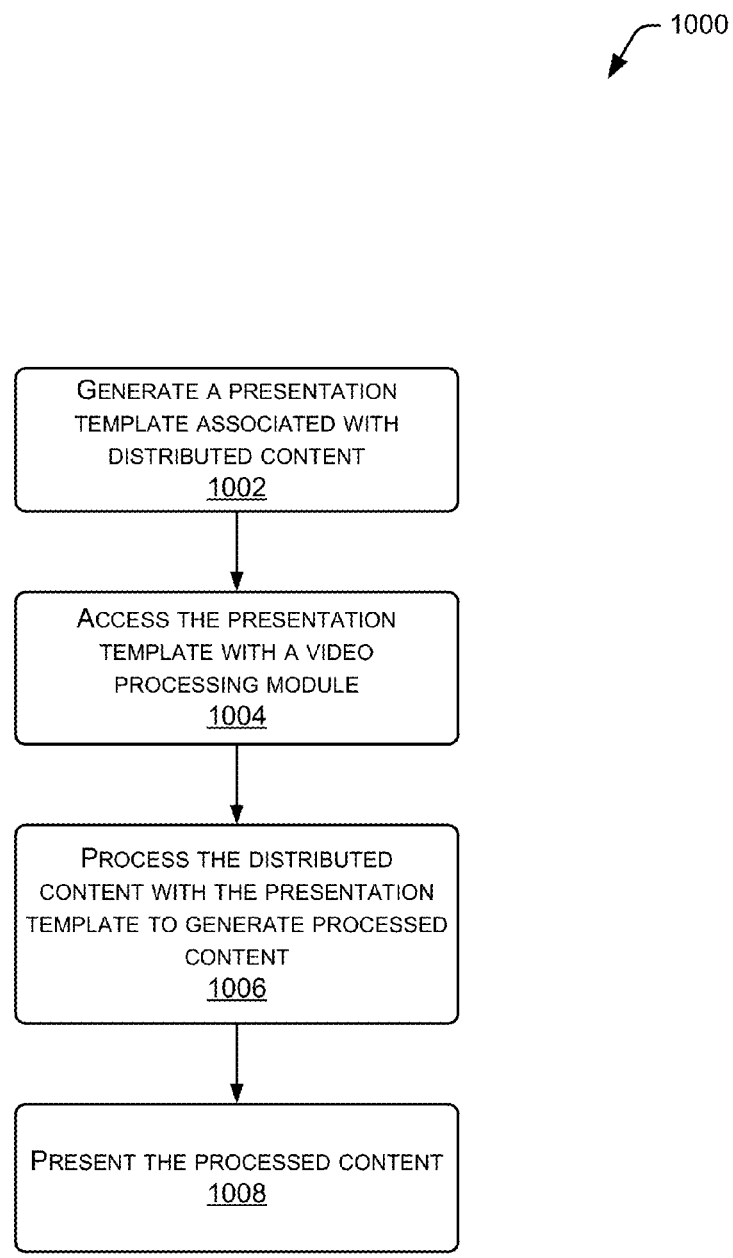
FIG. 10 illustrates a process for processing the distributed content with a presentation template.

FIG. 10 illustrates a process 1000 for processing the distributed content 108 with the presentation template 218. The process may be implemented at least in part by the video processing module 122.

Block 1002 generates a presentation template 218 associated with the distributed content 108. The presentation template 218 may be generated by a content provider, content provider, distributor, third-party processor, or individuals. As described above, the presentation template 218 provides information about one or more of cropping, scaling, resolution, and so forth to be used for processing the distributed content 108.

Block 1004 accesses the presentation template 218 with the video processing module 122. For example, a server may provide the presentation template 218 to the device 120 via a network connection. In another example, the device 120 may have one or more presentation templates 218 stored in the memory 204. The presentation template 218 may be associated specifically with the distributed content 108. For example, the content provider may have associated the particular presentation template 218(1) with the distributed content 108(1).

Block 1006 processes the distributed content 108 with the presentation template 218 to generate processed content 124. As described above, using the presentation template 218 the processed content 124 may be presented in a particular pre-determined fashion. For example, certain portions of the image frame may be scaled up, borders may be placed in particular locations, particular portions may be cropped to fit a display with a particular aspect ratio, and so forth.

Block 1008 presents the processed content 124, such as via the display device. The user now is able to experience the processed content 124. By processing the distributed content 108 with a particular presentation template 218, the user experience may be improved.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:
   accessing visual content comprising an image frame with initial borders adjacent to primary content;
   accessing content metadata describing a position of the primary content in the image frame;
   generating one or more revised borders based at least in part on the position of the primary content;
   determining supplemental content for presentation, the supplemental content comprising information associated with the primary content;
   receiving at least a portion of the supplemental content; and
   generating combined content by placing at least a portion of the received supplemental content within the one or more revised border.

2. The computer-readable media of claim 1, the accessing the content metadata comprising retrieving the content metadata or a portion thereof from a server.

3. The computer-readable media of claim 1, the operations further comprising:
   determining a resolution and an aspect ratio of the primary content, wherein the aspect ratio comprises a ratio of width to height of the primary content;
   determining, based at least in part on the determined resolution, a scaling factor configured to present the primary content with a maximum area within the image frame while maintaining the aspect ratio;
   generating scaled primary content by increasing a size of the primary content by the scaling factor; and
   wherein the generating the one or more revised borders is also based at least in part on the scaled primary content.

4. The computer-readable media of claim 1, the supplemental content comprising at least one of content recommendations, text captioning, data from one or more social networks, information about the content, and advertisements.

5. The computer-readable media of claim 1, wherein the one or more revised borders are arranged asymmetrically relative to a vertical axis of symmetry, a horizontal axis of symmetry, or a vertical and horizontal axis of symmetry.

6. One or more non-transitory computer-readable media storing computer-executable instructions that, when executed by at least one processor, configure the at least one processor to perform operations comprising:
   accessing visual content comprising a plurality of image frames;
   determining primary content presented within a rectangular area consistent across at least a portion of the plurality of image frames;
   determining an aspect ratio of the primary content;
   determining a scaling factor configured to enlarge the primary content while maintaining the aspect ratio;
   generating scaled primary content by increasing a size of the primary content by the scaling factor;
   generating one or more borders configured to fill the image frame unoccupied by the primary content;
   receiving supplemental content comprising information associated with the primary content; and
   merging the scaled primary content and the one or more borders for presentation, wherein the merging further comprising placing at least a portion of the received supplemental content configured for presentation within the one or more borders.

7. The computer-readable media of claim 6, the at least a portion of the plurality of image frames comprising temporally non-adjacent image frames.

8. The computer-readable media of claim 6, the scaling factor configured to maximize area of the scaled primary content within at least a portion of the plurality of the image frames.

9. The computer-readable media of claim 6, the determining the primary content comprising analyzing pixels to determine a rectangular area in the plurality of the plurality of image frames within which pixel values change relative to one another across the plurality of image frames.

10. The computer-readable media of claim 6, the supplemental content comprising at least one of content recommendations, text captioning, data from one or more social networks, information about the content, and advertisements.

11. The computer-readable media of claim 10, wherein the supplemental visual content is provided by a server.

12. The computer-readable media of claim 10, wherein one or more of size or position of the one or more borders is based at least in part on the supplemental content.

13. The computer-readable media of claim 10, the operations further comprising sending processed content to a display device using a network connection, the processed content comprising the scaled primary content, the one or more borders, and the supplemental content.

* * * * *